United States Patent
Laselva et al.

(10) Patent No.: US 11,533,251 B2
(45) Date of Patent: Dec. 20, 2022

(54) METHOD AND SYSTEM FOR DYNAMIC TRAFFIC DISTRIBUTION AND BI-CASTING IN A HYBRID NETWORK ENVIRONMENT

(71) Applicant: Nokia Technologies Oy, Espoo (FI)

(72) Inventors: Daniela Laselva, Klarup (DK); Troels Emil Kolding, Klarup (DK); Jeroen Wigard, Klarup (DK)

(73) Assignee: NOKIA TECHNOLOGIES OY, Espoo (FI)

(*) Notice: Subject to any disclaimer, the term of this patent is extended or adjusted under 35 U.S.C. 154(b) by 376 days.

(21) Appl. No.: 16/609,427

(22) PCT Filed: May 5, 2017

(86) PCT No.: PCT/IB2017/052643
§ 371 (c)(1),
(2) Date: Oct. 29, 2019

(87) PCT Pub. No.: WO2018/203113
PCT Pub. Date: Nov. 8, 2018

(65) Prior Publication Data
US 2020/0098251 A1 Mar. 26, 2020

(51) Int. Cl.
*H04L 45/24* (2022.01)
*H04L 45/121* (2022.01)
(Continued)

(52) U.S. Cl.
CPC ............ *H04L 45/24* (2013.01); *H04L 45/121* (2013.01); *H04L 45/123* (2013.01);
(Continued)

(58) Field of Classification Search
CPC ................. H04L 45/121; H04L 45/123; H04L 45/124; H04L 45/24; H04L 69/161; H04L 69/14
See application file for complete search history.

(56) References Cited

U.S. PATENT DOCUMENTS 3,023,424 A1   9/2011  Sachs et al.
9,264,353 B2 * 2/2016  Krishnaswamy ..... H04L 47/193
                      (Continued)

OTHER PUBLICATIONS

M. Scharf and A. Ford. "Request for Comments (RFC) 6897: Multipath TCP (MPTCP) Application Interface Considerations", Mar. 2013, 31 pages. (Year: 2013).*
(Continued)

*Primary Examiner* — George C Neurauter, Jr.
(74) *Attorney, Agent, or Firm* — Squire Patton Boggs (US) LLP

(57) ABSTRACT

A method, apparatus and computer program product are provided in accordance with example embodiments in order to provide for the efficient, dynamic distribution of traffic in a hybrid network environment based at least in part on reliability probabilities associated with individual subflows within the network. In some example implementations, a traffic distribution entity provides for control over the determination of combined reliability probabilities of multiple potential traffic distribution modes and the selection of a traffic distribution mode that is capable of meeting performance targets, such as those associated with mission-critical operations of cyber-physical systems.

20 Claims, 9 Drawing Sheets

(51) Int. Cl.
  *H04L 45/12* (2022.01)
  *H04L 69/14* (2022.01)
  *H04L 69/16* (2022.01)
(52) U.S. Cl.
  CPC ............ *H04L 45/124* (2013.01); *H04L 69/14* (2013.01); *H04L 69/161* (2013.01)

(56) References Cited

U.S. PATENT DOCUMENTS

| | | | |
|---|---|---|---|
| 9,350,672 | B2 | 5/2016 | Patwardhan et al. |
| 9,473,221 | B2 | 10/2016 | Kohli |
| 9,992,786 | B2* | 6/2018 | Han .................. H04W 72/1215 |
| 10,033,779 | B2* | 7/2018 | Frusina .............. H04N 21/6377 |
| 10,193,781 | B2* | 1/2019 | Han ...................... H04L 67/303 |
| 10,367,722 | B2* | 7/2019 | Freimuth .............. H04L 43/087 |
| 10,548,071 | B2* | 1/2020 | Maaref ............... H04W 72/087 |
| 10,594,766 | B2* | 3/2020 | Han ...................... H04W 76/10 |
| 10,819,420 | B2* | 10/2020 | Roy ........................ H04L 69/16 |
| 10,841,205 | B2* | 11/2020 | Kucera ................. H04L 69/163 |
| 11,031,998 | B2* | 6/2021 | Roy ...................... H04B 7/1851 |
| 2011/0294539 | A1 | 12/2011 | Shin et al. |
| 2011/0296006 | A1 | 12/2011 | Krishnaswamy et al. |
| 2013/0077501 | A1 | 3/2013 | Krishnaswamy et al. |
| 2015/0124742 | A1 | 5/2015 | Kandhalu Raghu et al. |
| 2015/0215922 | A1 | 7/2015 | Bahk et al. |
| 2015/0237525 | A1 | 8/2015 | Mildh et al. |
| 2015/0245409 | A1 | 8/2015 | Medapalli |
| 2016/0373339 | A1 | 12/2016 | Teyeb et al. |
| 2017/0085484 | A1* | 3/2017 | Hellander .............. H04W 24/08 |
| 2017/0085488 | A1 | 3/2017 | Bhattacharya et al. |
| 2017/0303157 | A1* | 10/2017 | Siomina .................. H04W 4/06 |

OTHER PUBLICATIONS

Maximilien Mouton. "Optimization of Handover Procedure Between IEEE 802.11 Access Points Under Vehicular Mobility in an Urban Environment", University of Luxembourg, The Faculty of Sciences, Technology and Communication, Jun. 2015, 138 pages. (Year: 2015).*

Sandeep Kumar Singh et al. "A Survey on Internet Multipath Routing and Provisioning", IEEE Communication Surveys and Tutorials, vol. 17, No. 4, Fourth Quarter 2015, 19 pages. (Year: 2015).*

A. Ford et al. "Request for Comments (RFC) 6182: Architectural Guidelines for Multipath TCP Development", Mar. 2011, 28 pages. (Year: 2011).*

Office action received for corresponding European Patent Application No. 17724643.6, dated Aug. 27, 2020, 13 pages.

Ford et al., "TCP Extensions for Multipath Operation with Multiple Addresses", RFC 6824, Internet Engineering Task Force (IETF), Jan. 2013, pp. 1-64.

Scharf et al., "MPTCP Application Interface Considerations", draft-ietf-mptcp-api-07, Internet Engineering Task Force, Jan. 19, 2013, pp. 1-34.

Wang et al., "Improving Multipath TCP for Latency Sensitive Flows in the Cloud", IEEE International Conference on Cloud Networking (Cloudnet), Oct. 3-5, 2016, pp. 45-50.

"Hybrid Access Broadband Network Architecture", TR-348, No. 1, Broadband Forum, Jul. 2016, pp. 1-49.

Briscoe et al., "Low Latency, Low Loss, Scalable Throughput (L4S) Internet Service: Architecture", draft-briscoe-tsvwg-l4s-arch-00, Transport Area Working Group, Oct. 31, 2016, pp. 1-26.

Ramakrishnan et al., "The Addition of Explicit Congestion Notification (ECN) to IP", RFC 3168, Network Working Group, Sep. 2001, pp. 1-63.

"3rd Generation Partnership Project; Technical Specification Group Radio Access Network; Study on Scenarios and Requirements for Next Generation Access Technologies; (Release 14)", 3GPP TR 38.913, V14.1.0, Dec. 2016, pp. 1-38.

Park et al., "Impact of Traffic Splitting on the Delay Performance of MPTCP", 2014 IEEE International Conference on Communications (ICC), Jun. 10-14, 2014, pp. 1204-1209.

Li et al. "AMTCP: An Adaptive Multi-path Transmission Control Protocol", Proceedings of the 12th ACM International Conference on Computing Frontiers, No. 29, May 18-21, 2015, 8 pages.

International Search Report and Written Opinion received for corresponding Patent Cooperation Treaty Application No. PCT/IB2017/052643, dated Jan. 29, 2018, 20 pages.

Office action received for corresponding European Patent Application No. 17724643.6, dated Jan. 18, 2022, 14 pages.

* cited by examiner

Rpconfn = 90%

Rpconfn = 80%

Rpconfn = 98%

Rpconfn = 99%

Rpconfn = 96%

Rpconfn = 99.6%

METHOD AND SYSTEM FOR DYNAMIC TRAFFIC DISTRIBUTION AND BI-CASTING IN A HYBRID NETWORK ENVIRONMENT

RELATED APPLICATION

This application was originally filed as PCT Application No. PCT/IB2017/052643 filed May 5, 2017.

TECHNICAL FIELD

An example embodiment relates generally to communications network technology, particularly in context of hybrid networks that combine loosely coupled technologies in order to provide support for mission-critical device operations that require high communication reliability within particularized timing constraints.

BACKGROUND

As modern communications networks have become increasingly ubiquitous and powerful, an ever-increasing number of devices and types of devices that are capable of interacting with such communications networks have been introduced. Advancements in communications network technology and in the devices that are capable of interacting with one or more networks have trended towards the development and introduction of cyber-physical systems ("CPS") and other devices and systems that rely on network connectivity to support mission-critical operations and functions.

Particularly in situations where a cyber-physical system or another system is likely to operate in a physical environment near individuals, objects, and/or structures, it is often essential that the connection between such a system and a network should be highly reliable and ensure that communications are sent and received by the system within particularized timing constraints. The technical challenges associated with meeting the requirements of such mission-critical operations are often compounded in situations involving cyber-physical systems and/or other system based on mobile and/or other wireless systems which potentially encounter multiple modern and/or legacy networks. The inventors of the invention disclosed herein have identified these and other technical challenges, and developed the solutions described and otherwise referenced herein.

BRIEF SUMMARY

A method, apparatus and computer program product are therefore provided in accordance with an example embodiment in order to provide methods, apparatuses, and/or systems that provide for efficient, dynamic distribution of traffic in a hybrid network environment based at least in part on reliability probabilities associated with individual subflows within the network.

In an example embodiment, a method is provided that includes receiving, at a traffic distribution entity in a hybrid network environment, a first reliability probability indicator associated with a first access network and a second reliability probability indicator associated with a second access network; determining, based at least in part on the first reliability probability indicator and the second reliability probability indicator, a combined reliability probability for each traffic distribution mode within a plurality of traffic distribution modes; ranking each traffic distribution mode with a combined reliability probability above a target reliability probability; and selecting a traffic distribution mode with a combined reliability probability above the target reliability probability.

In some example implementations of such a method, the first reliability probability indicator is an indicator of a composite metric of a packet loss ratio and a latency associated with the first access network and the second reliability probability indicator is an indicator of a composite metric of a packet loss ratio and a latency associated with the second access network. In some such example implementations, and in other example implementations, the hybrid network environment is a multi-path transmission control protocol (MPTCP) environment.

In some such example implementations, and in other example implementations, the first reliability indicator and the second reliability indicator are associated with at least part of a cyberphysical system or a high-reliability low-latency communication system operating within the hybrid network; the combined reliability probability for each traffic distribution mode within the plurality of traffic distribution modes is associated with at least part of the cyberphysical system or the high-reliability low-latency communication system operating within the hybrid network; and the target reliability probability comprises a real-time reliability requirement associated with the cyberphysical system or the high-reliability low-latency communication system operating within the hybrid network. In some such example implementations, and in other example implementations, ranking each traffic distribution mode with a combined reliability probability above a target reliability probability comprises applying a predefined cost function to each traffic distribution mode.

In some such example implementations, and in other example implementations, selecting the traffic distribution mode with a combined reliability probability above the target reliability probability comprises causing a transmission to be directed to the cyberphysical system via one subflow associated with either the first access network or the second access network. In some such example implementations, and in other example implementations, selecting the traffic distribution mode with a combined reliability probability above the target reliability probability comprises causing a bicasted transmission to be directed to the cyberphysical system via one subflow associated with the first access network and via one subflow associated with the second access network. In some such example implementations, and in other example implementations, selecting the traffic distribution mode with a combined reliability probability above the target reliability probability comprises causing a transmission to be directed to the cyberphysical system via one subflow associated with the first access network and causing a bicasted version of the transmission to be directed to the cyberphysical system via the second access network. In some such example implementations, and in other example implementations, selecting a traffic distribution mode with a combined reliability probability above the target reliability probability comprises selecting the traffic distribution mode with the highest ranking.

In another example embodiment, an apparatus is provided that includes at least one processor and at least one memory that includes computer program code with the at least one memory and the computer program code configured to, with the at least one processor, cause the apparatus to at least receive, in a hybrid network environment, a first reliability probability indicator associated with a first access network and a second reliability probability indicator associated with a second access network; determine, based at least in part on the first reliability probability indicator and the second reliability probability indicator, a combined reliability probability for each traffic distribution mode within a plurality of traffic distribution modes; rank each traffic distribution mode with a combined reliability probability above a target reliability probability; and select a traffic distribution mode with a combined reliability probability above the target reliability probability.

In some example implementations of such an apparatus, the first reliability probability indicator is an indicator of a composite metric of a packet loss ratio and a latency associated with the first access network and the second reliability probability indicator is an indicator of a composite metric of a packet loss ratio and a latency associated with the second access network. In some such example implementations, and in other example implementations, the hybrid network environment is a multi-path transmission control protocol (MPTCP) environment.

In some such example implementations, and in other example implementations, the first reliability indicator and the second reliability indicator are associated with at least part of a cyberphysical system or a high-reliability low-latency communication system operating within the hybrid network; the combined reliability probability for each traffic distribution mode within the plurality of traffic distribution modes is associated with at least part of the cyberphysical system or the high-reliability low-latency communication system operating within the hybrid network; and the target reliability probability comprises a real-time reliability requirement associated with the cyberphysical system or the high-reliability low-latency communication system operating within the hybrid network. In some such example implementations, and in other example implementations, ranking each traffic distribution mode with a combined reliability probability above a target reliability probability comprises applying a predefined cost function to each traffic distribution mode.

In some such example implementations, and in other example implementations, selecting the traffic distribution mode with a combined reliability probability above the target reliability probability comprises causing a transmission to be directed to the cyberphysical system via one subflow associated with either the first access network or the second access network. In some such example implementations, and in other example implementations, selecting the traffic distribution mode with a combined reliability probability above the target reliability probability comprises causing a bicasted transmission to be directed to the cyberphysical system via one subflow associated with the first access network and via one subflow associated with the second access network. In some such example implementations, and in other example implementations, selecting the traffic distribution mode with a combined reliability probability above the target reliability probability comprises causing a transmission to be directed to the cyberphysical system via one subflow associated with the first access network and causing a bicasted version of the transmission to be directed to the cyberphysical system via the second access network. In some such example implementations, and in other example implementations, selecting a traffic distribution mode with a combined reliability probability above the target reliability probability comprises selecting the traffic distribution mode with the highest ranking.

In a further example embodiment, a computer program product is provided that includes at least one non-transitory computer-readable storage medium having computer-executable program code instructions stored therein with the computer-executable program code instructions including program code instructions configured to receive, in a hybrid network environment, a first reliability probability indicator associated with a first access network and a second reliability probability indicator associated with a second access network; determine, based at least in part on the first reliability probability indicator and the second reliability probability indicator, a combined reliability probability for each traffic distribution mode within a plurality of traffic distribution modes; rank each traffic distribution mode with a combined reliability probability above a target reliability probability; and select a traffic distribution mode with a combined reliability probability above the target reliability probability.

In some example implementations of such computer program product, the first reliability probability indicator is an indicator of a composite metric of a packet loss ratio and a latency associated with the first access network and the second reliability probability indicator is an indicator of a composite metric of a packet loss ratio and a latency associated with the second access network. In some such example implementations, and in other example implementations, the hybrid network environment is a multi-path transmission control protocol (MPTCP) environment.

In some such example implementations, and in other example implementations, the first reliability indicator and the second reliability indicator are associated with at least part of a cyberphysical system or a high-reliability low-latency communication system operating within the hybrid network; the combined reliability probability for each traffic distribution mode within the plurality of traffic distribution modes is associated with at least part of the cyberphysical system or the high-reliability low-latency communication system operating within the hybrid network; and the target reliability probability comprises a real-time reliability requirement associated with the cyberphysical system or the high-reliability low-latency communication system operating within the hybrid network. In some such example implementations, and in other example implementations, ranking each traffic distribution mode with a combined reliability probability above a target reliability probability comprises applying a predefined cost function to each traffic distribution mode.

In some such example implementations, and in other example implementations, selecting the traffic distribution mode with a combined reliability probability above the target reliability probability comprises causing a transmission to be directed to the cyberphysical system via one subflow associated with either the first access network or the second access network. In some such example implementations, and in other example implementations, selecting the traffic distribution mode with a combined reliability probability above the target reliability probability comprises causing a bicasted transmission to be directed to the cyberphysical system via one subflow associated with the first access network and via one subflow associated with the second access network. In some such example implementations, and in other example implementations, selecting the traffic distribution mode with a combined reliability probability above the target reliability probability comprises causing a transmission to be directed to the cyberphysical system via one subflow associated with the first access network and causing a bicasted version of the transmission to be directed to the cyberphysical system via the second access network. In some such example implementations, and in other example implementations, selecting a traffic distribution mode with a combined reliability probability above the target reliability probability comprises selecting the traffic distribution mode with the highest ranking.

In yet another example embodiment, an apparatus is provided that includes means for receiving, at a traffic distribution entity in a hybrid network environment, a first reliability probability indicator associated with a first access network and a second reliability probability indicator associated with a second access network; determining, based at least in part on the first reliability probability indicator and the second reliability probability indicator, a combined reliability probability for each traffic distribution mode within a plurality of traffic distribution modes; ranking each traffic distribution mode with a combined reliability probability above a target reliability probability; and selecting a traffic distribution mode with a combined reliability probability above the target reliability probability.

In some example implementations of such an apparatus, the first reliability probability indicator is an indicator of a composite metric of a packet loss ratio and a latency associated with the first access network and the second reliability probability indicator is an indicator of a composite metric of a packet loss ratio and a latency associated with the second access network. In some such example implementations, and in other example implementations, the hybrid network environment is a multi-path transmission control protocol (MPTCP) environment.

In some such example implementations, and in other example implementations, the first reliability indicator and the second reliability indicator are associated with at least part of a cyberphysical system or a high-reliability low-latency communication system operating within the hybrid network; the combined reliability probability for each traffic distribution mode within the plurality of traffic distribution modes is associated with at least part of the cyberphysical system or the high-reliability low-latency communication system operating within the hybrid network; and the target reliability probability comprises a real-time reliability requirement associated with the cyberphysical system or the high-reliability low-latency communication system operating within the hybrid network. In some such example implementations, and in other example implementations, ranking each traffic distribution mode with a combined reliability probability above a target reliability probability comprises applying a predefined cost function to each traffic distribution mode.

In some such example implementations, and in other example implementations, selecting the traffic distribution mode with a combined reliability probability above the target reliability probability comprises causing a transmission to be directed to the cyberphysical system via one subflow associated with either the first access network or the second access network. In some such example implementations, and in other example implementations, selecting the traffic distribution mode with a combined reliability probability above the target reliability probability comprises causing a bicasted transmission to be directed to the cyberphysical system via one subflow associated with the first access network and via one subflow associated with the second access network. In some such example implementations, and in other example implementations, selecting the traffic distribution mode with a combined reliability probability above the target reliability probability comprises causing a transmission to be directed to the cyberphysical system via one subflow associated with the first access network and causing a bicasted version of the transmission to be directed to the cyberphysical system via the second access network. In some such example implementations, and in other example implementations, selecting a traffic distribution mode with a combined reliability probability above the target reliability probability comprises selecting the traffic distribution mode with the highest ranking.

BRIEF DESCRIPTION OF THE DRAWINGS

Figure 1:
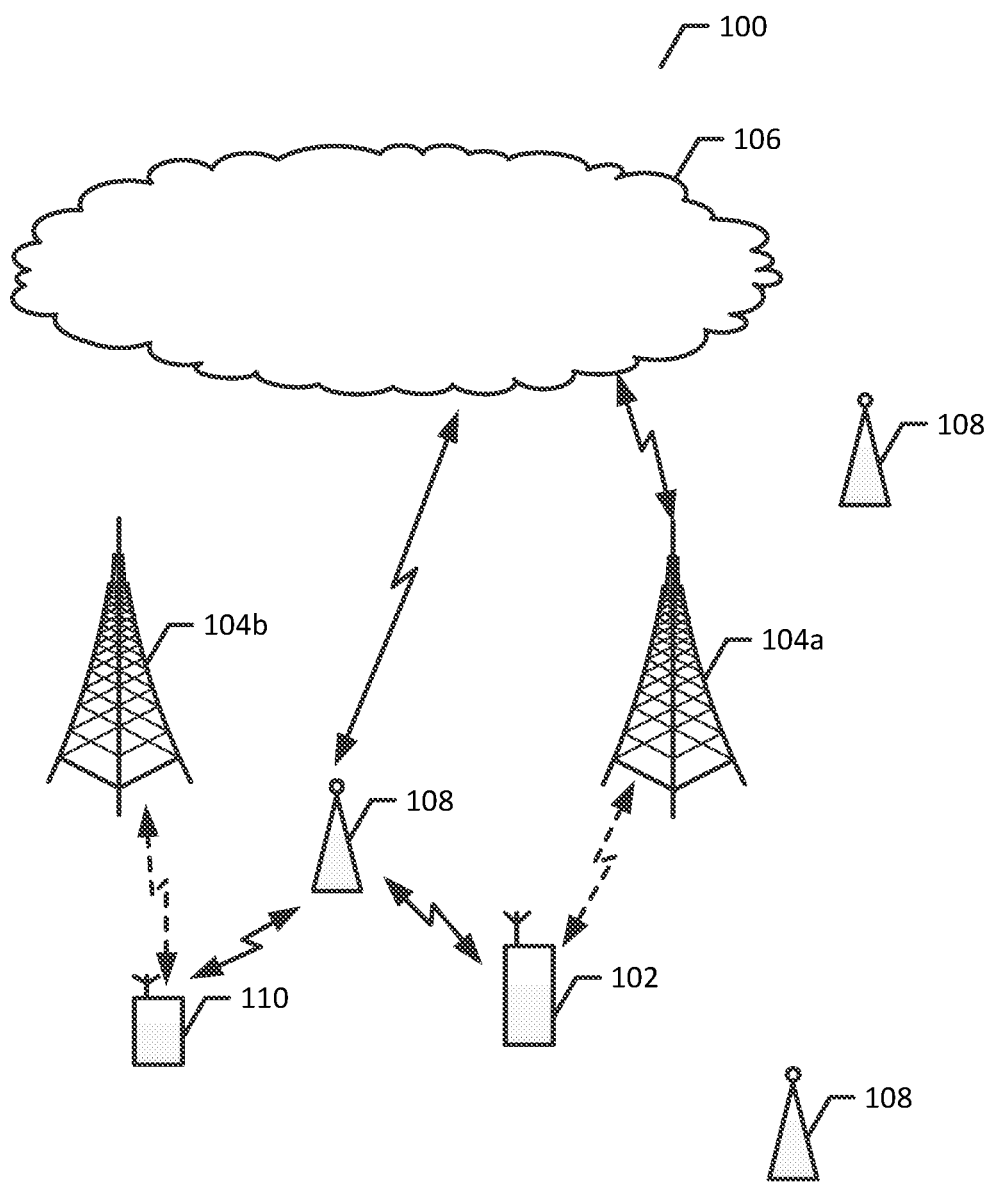
Figure 2:
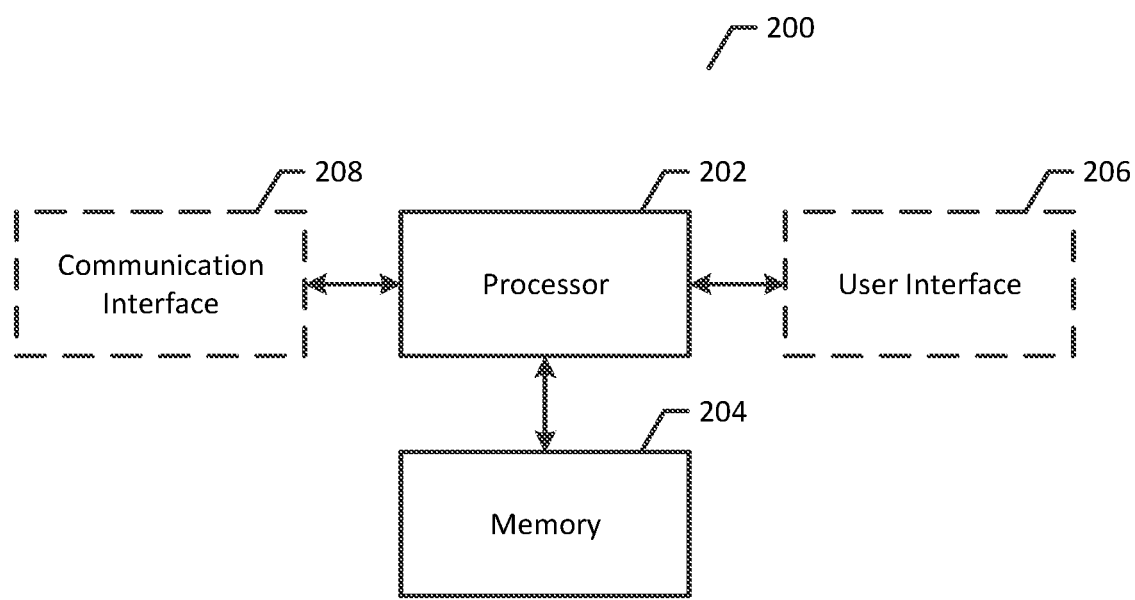
Figure 3:
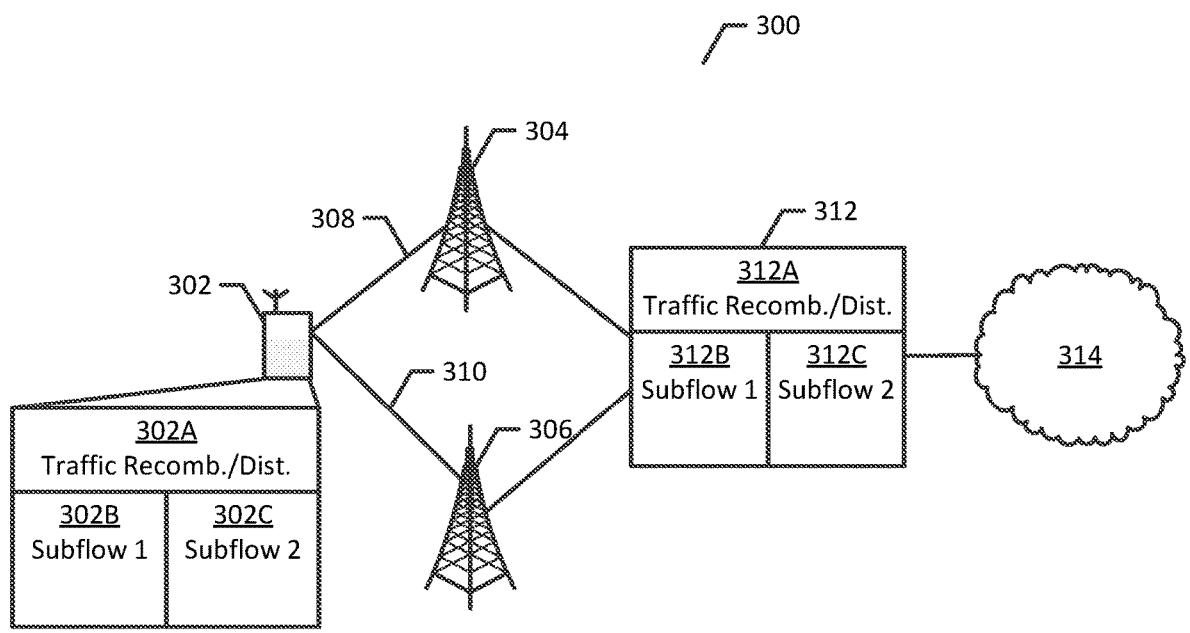
Figure 4:
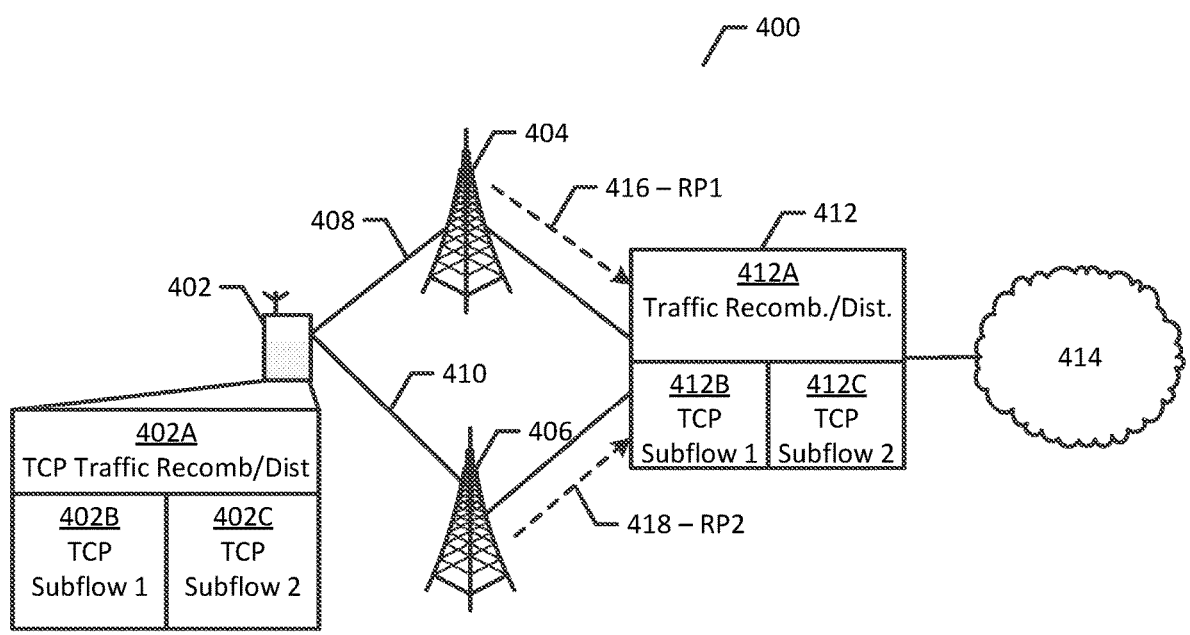
Figure 6:
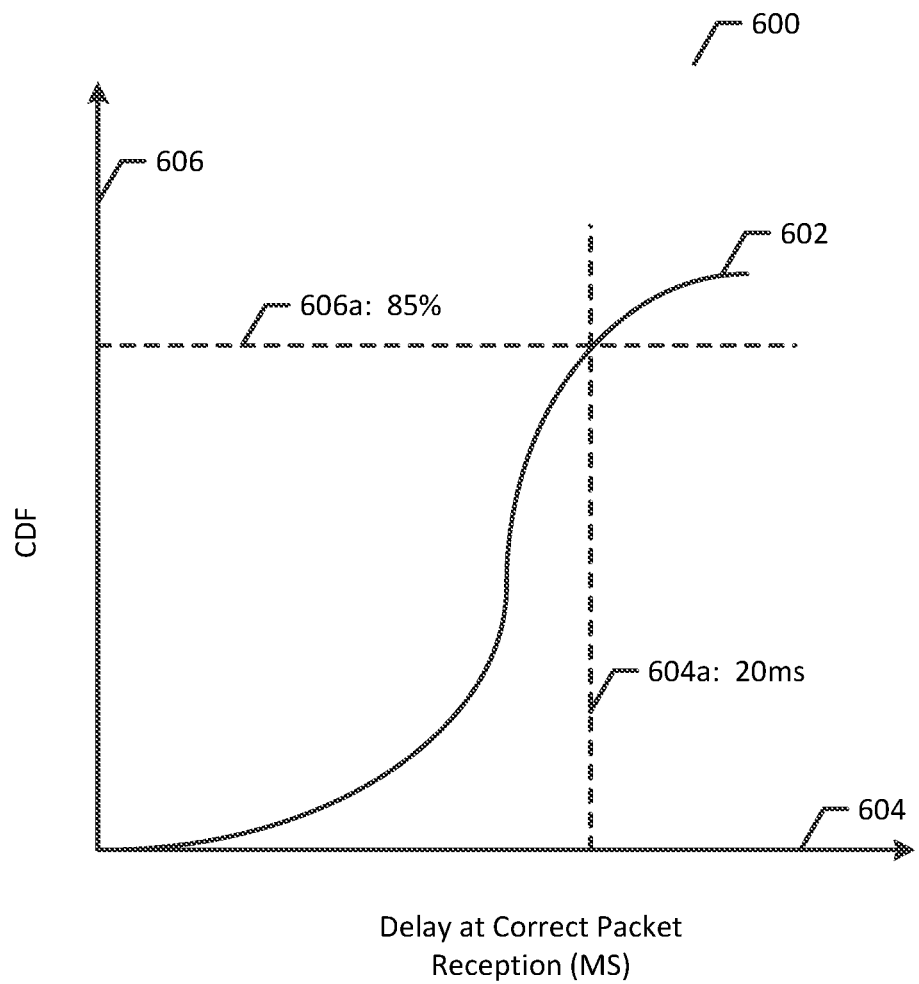
Figure 8:
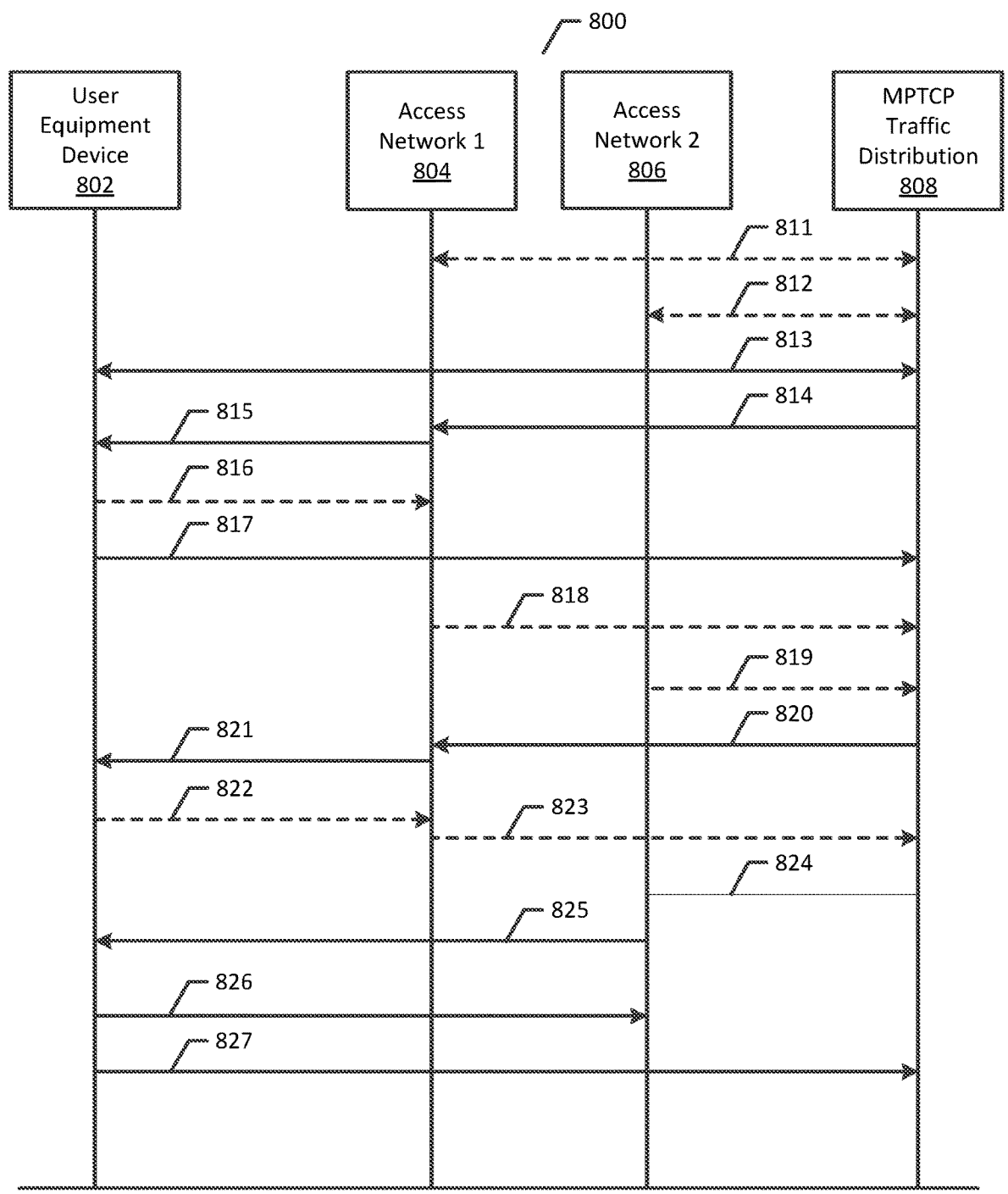
Figure 9:
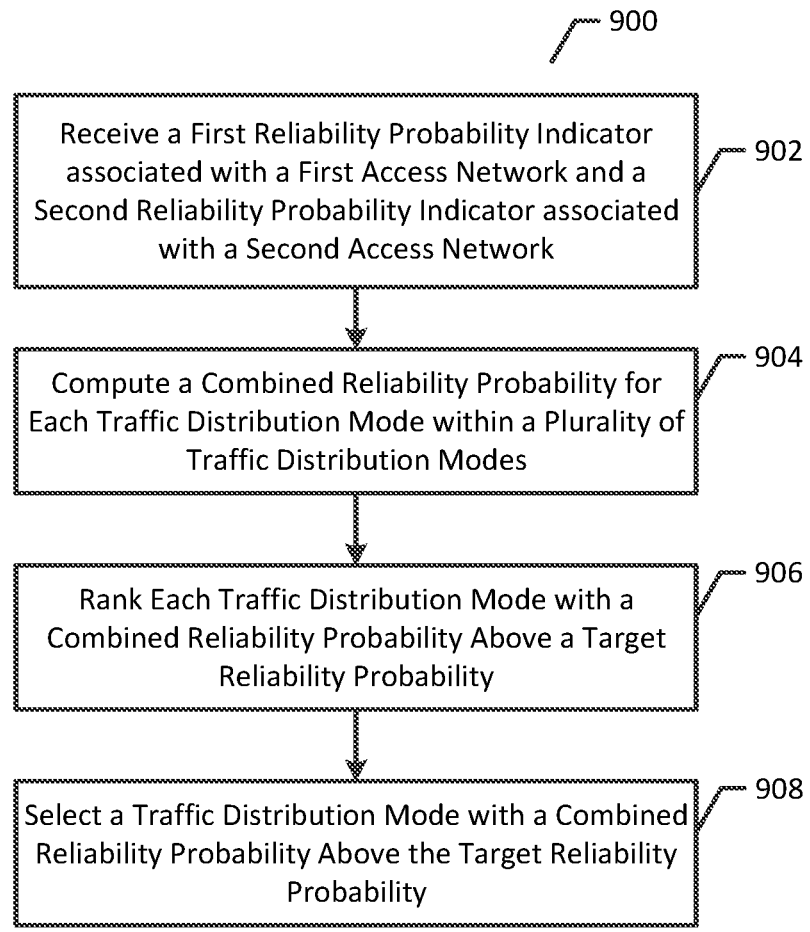

Having thus described certain example embodiments of the present disclosure in general terms, reference will hereinafter be made to the accompanying drawings, which are not necessarily drawn to scale, and wherein:

FIG. 1 depicts an example system environment in which implementations of example embodiments of the present invention may be performed;

FIG. 2 is a block diagram of an apparatus that may be specifically configured in accordance with an example embodiment of the present invention;

FIG. 3 depicts an example system environment in which aspects of implementations of example embodiments of the present invention may be illustrated and/or performed;

FIG. 4 depicts an example system environment in which aspects of implementations of example embodiments of the present invention may be performed;

FIGS. 5A-5F depict traffic distribution modes which may be used in connection with implementations of example embodiments of the present invention;

FIG. 6 is a graphical representation of a performance of a radio node that illustrates concepts associated with example embodiments of the invention;

FIGS. 7A-7F depict annotated versions of FIGS. 5A-5F which provide additional detail regarding aspects of example embodiments of the present invention;

FIG. 8 is a message flow diagram depicting an example implementation of embodiments of the present invention; and FIG. 9 is a flowchart illustrating a set of operations performed, such as by the apparatus of FIG. 2, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with example embodiments in order to provide for the dynamic distribution of network traffic based on reliability probabilities of individual subflows within a hybrid network environment. Many implementations of example embodiments of the invention described and otherwise disclosed herein are directed to solving the technical challenges associated with providing a combined, reliable, and real-time connectivity solution for a given combined target over a hybrid network which may consist of several network subflows and/or sub-networks.

Example embodiments of the invention described and/or otherwise disclosed herein generally relate to the use of hybrid networks that may combine loosely coupled technologies for the support of mission critical use cases. It will be appreciated that some example implementations of embodiments of the invention are directed to providing network connectivity that meets mission-critical reliability and timing requirements at a lower cost and faster time-to-market than conventional approaches. For example, some example implementations are directed to mission-critical applications in scope that demand high network reliability (for example, up to 99.999%) for a specified real-time requirement (for example, at a 10-100 ms level). Some such example implementations involve and/or may be referred to as reliable real-time cyber-physical systems (CPS). It will be appreciated that, in many contexts, CPS systems should be distinguished from 3GPP ultra-reliability low-latency communications (URLLC) that target what is often referred to as "5-nines" reliability with latency down to a 1 ms level.

As noted herein, many example implementations are particularly directed to addressing technical challenges that arise in contexts involving hybrid networks. For example, some example implementations of embodiments of the invention described and/or otherwise disclosed herein involve and/or contemplate the combining of legacy 3GPP technologies, such as networks and/or portions of networks that incorporate 2G and/or 3G protocols and/or other aspects, with implementations of more recent LTE/NR (5G) radios. Some such example implementations and other example implementations contemplate and/or involve combining the networks of two or more operators for optimized and/or otherwise improved site and equipment diversity (which may involve multi-homing, for example). Some such example implementations and other example implementations involve further combining 3GPP access with non-3GPP and non-integrated solutions such as Wi-Fi, Multefire, Lora, and possibly even satellite networks, which can be envisioned to realize such a wireless hybrid access network. In some situations, example embodiments of the invention described and/or otherwise disclosed herein address technical issues associated with extensions of state-of-the-art hybrid access technologies to become capable of delivering wireless, reliable, real-time and/or near real-time connectivity.

FIG. 3 presents an example network environment 300 which may be useful for presenting a simplified explanation of some of the technical challenges addressed and overcome by example embodiments of the invention described and/or otherwise disclosed herein. It will be appreciated that example network environment is merely provided to provide context to and assist in explanations of some aspects of some of the technical challenges that arise in at least some hybrid networks. Nothing in FIG. 3 or the related discussion of such technical challenges should be construed as limiting the technical challenges addressed by embodiments of the invention (or the approaches taken by example implementations of embodiments of the invention) to the particular environment depicted in FIG. 3.

As shown in FIG. 3, example environment 300 involves a hybrid network that involves at least two underlying access networks: a first access network 304 and a second access network 306. In some example implementations, the first access network 304 incorporates and/or involves a first interface which may be assigned an identifier such as PLMN1 and/or SSID1, for example. Likewise, in some example implementations, the second access network 304 incorporates and/or involves a second interface which may be assigned an identifier such as PLMN2 and/or SSID2.

Depending on the situation and context in which an example implementation of environment 300 arises, access networks 304 and 306 could potentially belong to different operators (which may be reflected through the use of identifiers such as PLMN1 and/or PLMN2) as well as use the same or different radio access technologies (for example, LTE PLMN1, WLAN SSID2). It will be appreciated that in many situations, each access network in a hybrid network environment such as environment 300 should be considered to be a black box, at least in the sense that a user of a network device that interacts with access networks 304 and 306 and/or other access networks within a hybrid environment will typically have little or no control over the underlying structure, function, and operation of the hybrid network as a whole and/or the access networks 304 and 306 within such a network environment.

As shown in FIG. 3, environment 300 involves, at one end, a multihoming or Multi-Path TCP capable device 302. In some example implementations, device 302 is connected simultaneously to both access networks 304 and 306. In FIG. 3, device 302 may send and receive information and/or otherwise interact with access network 304 via subflow 308, which, in the example implementation shown in FIG. 3, may be considered to be a primary subflow. As also shown in FIG. 3, device 302 may send and receive information and/or otherwise interact with access network 306 via subflow 310, which, in the example implementation shown in FIG. 3, may be considered to be a secondary subflow. In some example implementations, the device 302 is configured to incorporate a traffic recombination and distribution module 302a which may interact with modules 302b and 302c, which are configured to transmit and/or receive the subflows 308 and 310 (as shown in FIG. 3, with module 302b interacting with subflow 308 and module 302c interacting with subflow 310). Regardless of its exact configuration, device 302 can combine the traffic of a given application received by the two networks 304 and 306 in the downlink direction. Likewise, in the uplink direction, the device 302 can split the traffic on a given application across the two networks 304 and 306 which is then recombined at the network side at the MPTCP proxy/server or multihoming anchor point 312. In some example implementations, the MPTCP proxy/server 312 is configured to incorporate a traffic recombination and distribution module 312a which may interact with modules 312b and 312c, which are configured to transmit and/or receive the subflows 308 and 310, as relayed by their respective access networks 304 and 306 (as shown in FIG. 3, with module 312b interacting with subflow 308 via access network 304 and module 312c interacting with subflow 310 via access network 306). Regardless of its exact configuration, MPTCP proxy/server 312 can combine the traffic of a given application received by the two networks 304 and 306 in the uplink direction. Likewise, in the downlink direction, the MPTCP proxy/server 312 can split the traffic across the two networks 304 and 306 which is then recombined at the client side at mobile device 302. As shown in FIG. 3, the MPTCP proxy/sever 312 is configured to also be able to interact with the Internet and/or other networks 314.

One of the significant technical challenges addressed by example embodiments of the invention described and/or otherwise disclosed herein is the design of an efficient traffic distribution control at the bifurcation point (such as the MPTCP proxy/server 312 shown in FIG. 3, for example). Addressing such a technical challenge involves aspects related to network resource allocation and usage and aspects involving user equipment battery, which meeting the wireless reliable real-time connectivity targets that may be imposed in a given situation and/or context. In particular, example embodiments of the invention described and/or otherwise disclosed herein address challenged involved with the efficient control of packet distribution over two or more access networks in a manner that guarantees network resource availability and reliability at a specified level (such as up to 99.999%, for example) and for specified real-time requirement (such as at a 10-100 ms level, for example).

It will be appreciated that some approaches attempt to address some of the technical challenges that arise in hybrid network environments. For example, some multi-connectivity (MC) solutions involve transmission and reception to an end-user device across multiple communication subflows simultaneously. In such approaches, MC is used primarily to boost data rates, improve mobility performance, and, as a secondary function, to provide connectivity backup during primary network downtimes. However, none of the existing approaches address specifically reliable real-time requirements. For example some MP approaches use TCP properties to infer path properties, namely round-trip time (RTT) estimation, and to make forwarding decisions with the aim of reducing reordering delays that are known to impair TCP performance. In some other approaches, every packet of a short flow is replicated and transmitted concurrently across multiple subflows. While such approaches may reduce the retransmission delays associated with lost packets, they necessarily create significant overhead in the network.

It will be appreciated that the term "reliability", as used herein, conforms to the definition contained in 3GPP (TR 38.913) as a composite metric of latency and packet loss ratio, namely, the probability to transfer successfully X bytes within a certain delay budget.

Example embodiments of the invention described and/or otherwise disclosed here address these and other technical challenges by providing an approach for dynamic traffic distribution based at least in part on reliability probabilities of the single subflows. As such, example embodiments of the invention also provide a combined reliable realtime connectivity solution operating to a given combined target over a hybrid network consisting of several network subflows (or sub networks). While some of the example implementations discussed herein involve or contemplate availability and/or reliability up to 99.999% at a specified latency of less than 100 ms, it will be appreciated that exact and/or other targets are configurable. Some example implementations of embodiments of the invention are particularly advantageous when used in connection with wide area cyber physical systems (CPS), including but not limited to systems associated with autonomous vehicles such as drones, trains, cars as well as industrial applications, for example.

In some example implementations, embodiments of the invention provide for and use the prediction capability of inferring the likelihood that a relevant reliability target can be met for both the individual subflows within a hybrid environment and for the overall hybrid environment. In some example implementations, the approach taken to provide and use such capabilities involves the following:

(1) The computation of reliability probabilities on a per subflow (which also referred to as link) basis. In some situations, the reliability probabilities indicate the likelihood of correct data reception at L3/L4 (such as in situations involving TCP/UDP/IP, for example) within a given delay for the given subflow;

(2) The signaling of such reliability probabilities and/or related metrics to the control system for the hybrid network, such as via predefined interface and signaling protocol, for example. In some of the examples discussed herein, the control system may be referred to as a traffic distribution entity;

(3) At the control system or traffic distribution entity, the computation of a combined reliability probability for different configurations of traffic distribution modes (for example, single-network-only, single-network-only plus selected packet duplication over the other network, bi/multi-casting serially, bi/multi-casting in parallel); and (4) The dynamic selection of the preferred traffic distribution mode from among the modes which meet a predefined reliability probability target. In some situations, this may involve a sequence of L3/L4 packets, with the objective of minimizing a defined cost function (such as the cost of network/bandwidth use, energy, network resource, and/or penalties from not meeting the reliability target, or the like for example).

Some example implementations of embodiments of the invention take an iterative approach to dynamically distributing traffic within a hybrid network environment. In such implementations, a traffic distribution entity queries and/or receives one or more reliability probabilities per each relevant link in the hybrid network. In some situations, these reliability probabilities may be marked as a ReliabilityProbability or RP. Upon receipt of the reliability probabilities, the traffic distribution entity computes a combined reliability probability for various different configurations of traffic distribution modes. In some situations, these combined reliability probabilities may be marked as a combined ReliabilityProbability or combinedRP. After the combined reliability probabilities are calculated, the traffic distribution entity ranks each traffic distribution mode for which the relevant combined reliability probability is higher than a target reliability probability. In some situations, a pre-defined rule set, such as a cost function, for example, may be used in connection with ranking the combined reliability probabilities. The traffic distribution entity may then select the best traffic distribution mode (based at least in part on the ranking). These steps may be iteratively performed by a traffic distribution entity at predetermined time intervals, in response to the detection of one or more events and/or occurrences, and/or in conformance with predetermined rules established in connection with the traffic distribution entity.

While the method, apparatus and computer program product of an example embodiment may be deployed in a variety of different systems, one example of a system that may benefit from the procedures discussed and contemplated herein in accordance with an example embodiment of the present invention is depicted in FIG. 1. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment devices 102 configured to communicate wirelessly, such as via one or more access networks, with a network 106. Although the user equipment 102 may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems.

In addition to the more traditional types of user equipment 102 which may be present within a given system environment, system environment 100 also includes one or more devices 110 that are capable of interacting with a system environment, such as through the use of wireless communication. In some example implementations, one or more of the devices 110 may be incorporated into and/or otherwise associated with an Internet-of-Things (IoT) user equipment device, which may be referred to as an IoT device. In some example implementations, one or more devices 110 may be incorporated into and/or otherwise associated with a cyberphysical system, which may include but are not limited to autonomous vehicles (such as drones, trains, cars, and the like, for example) and/or industrial equipment, for example. Although the user equipment device 102 and the device 110 may be configured in a variety of different manners, it will be appreciated that in many of the example implementations discussed and otherwise contemplated herein the relevant device 102 and/or relevant device 110 will be configured to operate in a hybrid network, including but not limited to interacting with multiple access networks which may be available to a given device 102 and/or device 110.

System environment 100, as depicted in FIG. 1, also includes one or more access points 104a and 104b, such as base stations (such as node Bs, evolved Node Bs (eNB), or the like, for example). A cellular access point, such as a base station, may define and service one or more cells. The access points may, in turn, be in communication with a network 106, such as a core network via a gateway, such that the access points establish cellular radio access networks by which the user equipment 102 and/or sensors 110 may communicate with the network. The system environment 100 of FIG. 1 may include a plurality of different cellular radio access networks including, for example, a 5G radio access network, an LTE radio access network, a UMTS (universal mobile telecommunications system) radio access network, etc. In some example implementations, equipment and other infrastructure associated with multiple different cellular radio access networks may be located at or near structures and/or other equipment associated with a particular access point, such as access point 104a and 104b.

In some implementations of system environment 100, the cellular radio access networks serviced by access points 104a, 104b, and any other access points in a given area are identical, in the sense that as user equipment 102 and/or sensor 110 moves from an area serviced by access point 104a to an area serviced by access point 104b, the user equipment 102 and/or sensor device 110 is able to access the network 106 via a radio access network provided by the same vendor across access points. In some implementations of system environment 100, the cellular radio access networks serviced by access points 104a and 104b may be different and/or part of a hybrid network that incorporates network elements conforming to different standards or protocols, incorporates network elements belonging to different vendors and/or operators, and/or incorporates network elements that are otherwise loosely coupled and/or relatively independent of each other. Although not shown, the system may also include one or more controllers associated with one or more of the cellular access points, (such as base stations for example), so as to facilitate operation of the access points and management of the user equipment 102 and/or sensor 110 in communication therewith. As shown in FIG. 1, a system may also include one or more wireless local area networks (WLANs), each of which may be serviced by a WLAN access point 108 configured to establish wireless communications with the user equipment 102 and/or the sensor 110. As such, the user equipment 102 and/or the sensor 110 may communicate with the network via a WLAN access point as shown in solid lines in FIG. 1, or, alternatively, via a cellular access point as shown in dashed lines. The radio access networks as well as the core networks may consist of additional network elements as routers, switches, servers, gateways, and/or controllers.

In connection with the approaches to provide dynamic traffic distribution based on reliability probabilities of the individual subflows within a hybrid network environment, some example implementations of embodiments of the invention disclosed and/or otherwise described herein contemplate the use of network entities such as servers (including but not limited to cloud servers, for example), gateways, and/or other network elements that operate as a control system, which may be referred to herein as a traffic distribution entity. In this regard, the calculation, processing, and use of network subflow reliability profiles to dynamically direct and redirect network traffic can be accomplished by an apparatus 200 as depicted in FIG. 2. The apparatus may be embodied by and/or incorporated into one or more servers, such as a server associated with network 106, or any of the other devices discussed with respect to FIG. 1, such as access points 104a and/or 104b, one or more of WLAN access points 108, and/or devices that may be incorporated or otherwise associated with system environment 100. The apparatus may be embodied by and/or incorporated into any of the devices discussed in connection with FIG. 3 or 4, including but not limited to the multihoming anchor/MPTCP proxy/server 312 and/or MPTCP proxy 412. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, (such as a smartphone, a tablet computer, or the like, for example). In some example implementations, it may be particularly advantageous to implement the apparatus 200 in connection with one or more network elements and/or functions.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (such as a computer readable storage medium, for example) comprising gates configured to store data (such as bits, for example) that may be retrievable by a machine (such as a computing device like the processor, for example). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (such as chips, for example) including materials, components and/or wires on a structural assembly (such as a baseboard, for example). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (such as by being physically embodied in circuitry, for example) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (such as a pass-through display or a mobile terminal, for example) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (such as software and/or firmware, for example) stored on a memory accessible to the processor (such as memory device 204, and/or the like, for example).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As such, for example, the communication interface may include a communication modem and/or other hardware/software for supporting communication via cable, digital subscriber line (DSL), universal serial bus (USB) or other mechanisms.

As noted herein, many implementations of example embodiments of the invention described, contemplated, and/or otherwise disclosed herein are directed to solutions that allow for the dynamic distribution of traffic in a hybrid network environment based at least in part on the calculation, analysis, and use of reliability probabilities of the individual subflows available within the hybrid network. Some such example implementations allow for the provision of a combined, reliable, real time or near-real time connectivity solution that may be used to ensure that connectivity between a cyberphysical system and a hybrid network meet relevant availability and/or reliability thresholds at certain latency requirements.

FIG. 4 provides an example network environment 400 in which aspects of embodiments of the invention may be illustrated. For purposes of clarity and simplicity, the examples discussed in connection with FIG. 4 assume the use of MPTCP aspects and involve two underlying networks within the hybrid network environment 400. However, it will be appreciated that the concepts discussed herein, and the invention described and/or otherwise disclosed herein, are applicable also when assuming any other transport model mechanisms to transport traffic between the traffic distribution entity and the client (including but not limited to tunneling, for example). It will also be appreciated that the invention described and/or otherwise disclosed herein may be implemented in situations involving more than two subnetworks (or sub-flows or links), depending on their availability within a given hybrid network environment. Moreover, it will be appreciated that example implementations can also be applicable for single link systems as well as when more than two networks are present.

As shown in FIG. 4, example environment 400 involves a hybrid network that involves at least two underlying access networks: a first access network 404 and a second access network 406. In some example implementations, the first access network 404 incorporates and/or involves a first interface which may be assigned an identifier such as PLMN1 and/or SSID1, for example. Likewise, in some example implementations, the second access network 304 incorporates and/or involves a second interface which may be assigned an identifier such as PLMN2 and/or SSID2, for example.

It will be appreciated that first and second access networks 404 and 406 are similar to access networks 304 and 306 discussed herein with respect to FIG. 3, at least in the sense that, depending on the situation and context in which an example implementation of environment 400 arises, access networks 404 and 406 may belong to different operators as well as use the same or different radio access technologies. Regardless of the precise configurations and relationships between access networks 404 and 406, both access networks 404 and 406 are configured to be capable of communicating with a user device 402.

Example hybrid environment 400 involves, at one end, a multihoming or Multi-Path TCP (MPTCP) capable user device 402. In the example depicted in FIG. 4, device 402 is connected simultaneously to both access networks 404 and 406. As such, device 402 may send and receive information and/or otherwise interact with access network 404 via subflow 408, which, in the example implementation shown in FIG. 4, may be considered to be a primary TCP subflow. As also shown in FIG. 4, device 402 may send and receive information and/or otherwise interact with access network 406 via subflow 410, which, in the example implementation shown in FIG. 4, may be considered to be a secondary TCP subflow.

As depicted in FIG. 4, the device 402 is configured to incorporate a traffic recombination and distribution module 402a which may interact with modules 402b and 402c, which are configured to transmit and/or receive the subflows 408 and 410 (as shown in FIG. 4, with module 402b interacting with subflow 408 and module 402c interacting with subflow 410). Regardless of its exact configuration, device 402 can combine the traffic of a given application received by the two networks 404 and 406 in the downlink direction. Likewise, in the uplink direction, the device 402 can split the traffic on a given application across the two networks 404 and 406 which is then recombined at the network side at the MPTCP proxy 412. While in the example depicted in FIG. 4 shows user device 402 to be an MPTCP device, it will be appreciated that other example implementations of hybrid network 400 and other embodiments of the invention may involve other user devices that are capable of interacting with multiple subflows or other communication streams in a hybrid network environment.

As shown in FIG. 4, the MPTCP proxy 412 is configured to incorporate a traffic recombination and distribution module 412a (which may be referred to as a traffic distribution entity), which may incorporate and/or interact with modules 412b and 412c, which are configured to transmit and/or receive the subflows 408 and 410, as relayed by their respective access networks 404 and 406. As shown in FIG. 4, module 412b interacts with subflow 408 via access network 404 and module 412c interacts with subflow 410 via access network 406). Regardless of its exact configuration, MPTCP proxy 412 can combine the traffic of a given application received by the two networks 404 and 406 in the uplink direction. Likewise, in the downlink direction, the MPTCP proxy 412 can determine how to split the traffic across the two networks 404 and 406 which is then recombined at the client side at mobile device 402. As shown in FIG. 4, the MPTCP proxy 412 is configured to also be able to interact with the Internet and/or other networks 414.

As shown in FIG. 4, in addition to receiving application-related information, user generated information, and/or other communications payload information via access networks 404 and 406, the MPTCP proxy 412 is also configured to receive reliability probability information 416 from access network 404 and reliability probability information 418 from access network 406. In some example implementations the reliability probabilities 416 and 418 are a composite metric of a relevant latency and a relevant packet loss ratio, such that it represents that probability to successfully transfer a certain number of bytes and/or other quantity of data within a certain delay budget or other timing parameter.

As noted herein, MPTCP proxy 412, through the operation of the traffic recombination and distribution module 412a and modules 412b and 412c, functions as a traffic distribution entity. In some example implementations, traffic recombination and distribution module 412a and/or other components of MPTCP proxy 412 provide for predictive traffic distribution by: (1) monitoring the relevant subflows, which may include monitoring their respective reliability probability metrics and/or other indications of reliability, such as TCP acknowledgement (ACK) or non-acknowledgment (NACK) messages; (2) dynamic evaluation of the available traffic distribution modes based at least in part on a comparison of a combination of the relevant reliability probability metrics with a target reliability probability metric; and (3) potentially adjusting the traffic distribution mode. In some example implementations, an adjustment to the traffic distribution mode may be associated with a reliability-based trigger, such as an indication that the communication reliability is likely to fall short of a target reliability threshold.

FIGS. 5A-5F depict a series of multiple different transmission modes that may be used in example environments (such as example hybrid environment 400, for example) that involve two access networks, subflows, and/or links, which are marked in FIG. 5 as access network 502 and access network 504, respectively. For the purposes of clarity, a solid line represents a single transmission within a given network, a double line represents bicasting of the same packet or sequence of patents, and a dotted line represents no transmission. It will be appreciated that the example modes presented in FIGS. 5A-5F present non-limiting examples of the transmission modes that may be used in a given network environment, and that other transmission modes may be used depending on the precise implementation of the hybrid network and the capabilities of the underlying component networks therein. Moreover, it will be appreciated that the distribution modes presented in FIG. 5A-5F can be expanded to a larger number of combinations assuming the availability of more than two access networks, and may be generalized to any number of links, as well.

Figure 5A:
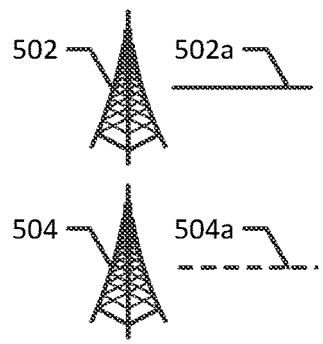

FIG. 5A depicts a transmission mode where a single transmission 502a is made via access network 502, and no transmission is made via access network 504.

Figure 5B:
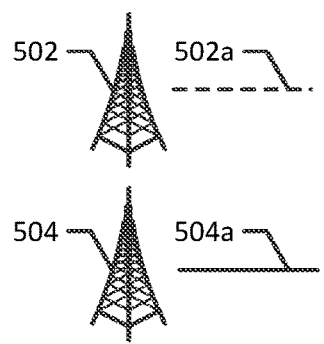

FIG. 5B depicts a transmission mode where a single transmission 504a is made via access network 504, and no transmission is made via access network 502.

Figure 5C:
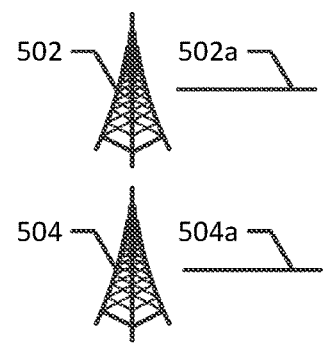

FIG. 5C depicts a transmission mode that involves bicasting in parallel where a single transmission 502a is made via access network 502, and a single transmission 504a is made via access network 504.

Figure 5D:
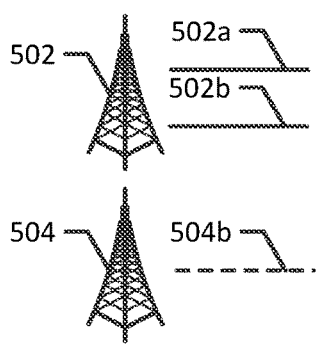

FIG. 5D depicts a transmission mode that involves serial bicasting, where two transmissions 502a and 502b are made via access network 502, and no transmission is made via access network 504.

Figure 5E:
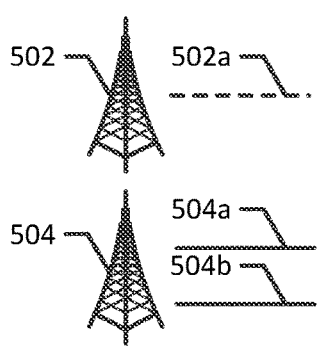

FIG. 5E depicts a transmission mode that involves serial bicasting, where two transmissions 504a and 504b are made via access network 504, and no transmission is made via access network 502.

Figure 5F:
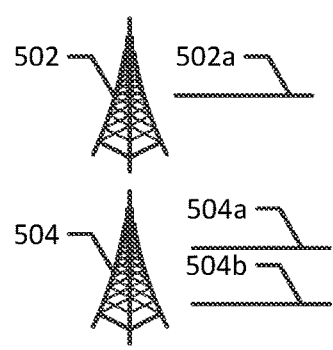

FIG. 5F depicts a transmission mode that involves serial and parallel bicasting, where one transmission 502a is made via access network 502, and two transmissions 504a and 504b are made via access network 504.

The Subflow Reliability Metric

As noted herein, some example implementations of embodiments of the invention involve the determination, processing, and use of one or more subflow reliability metrics. For example, in order for the traffic distribution function to determine the optimal number of subflows to use and their configuration (such as to select between the various transmission distribution modes depicted in FIGS. 5A-5F, for example), each subflow reports a probability reliability metric. In some example implementations, the reliability metric indicates the likelihood of a packet (at an L3/L4 level, for example) to be correctly received within a given delay budget. In some instances, this may be expressed as a probability indicated by a percentage value, for example. The value may also have a time-domain component. For example the value may be of a relatively semi-static nature (for example, where it is averaged over a significant time window and thus apply for a longer duration of time) or can be of a more instantaneous and dynamic nature (for example where it relates to a short time-frame and may only be valid for a short time-frame in the near future).

In an example implementation, the delay budget for which the metric is obtained can be configured by the traffic distribution unit so that the subflow provides one or more optimal metric estimates tailored for the specific application or use-case. In other example implementations, the delay metric may be a more generic value (and/or always reported for multiple values) such as where the application needs to extrapolate and/or otherwise estimate the total relevant application latency requirement.

Depending on the situation in which an example implementation arises, particularly with respect to the nature of the transmissions and the contexts in which the various network elements operate, an example value of the reliability probability metric may be, for example, 90%, which would indicate that there is a 90% probability that a packet or a certain sequence of packets is correctly received by the end point within the delay budget (which could be configured to 50 ms, for example).

In some example implementations, each subflow (which could involve, for example, a full access network) may apply information and/or other intelligence from all of the relevant network components to achieve a total reliability estimate for the whole subflow. For example, such a total reliability estimate may take into account core routing delays, load and congestion situations in the transmission network, and/or load and signal quality in the radio network. Regardless of the information used to develop the reliability network, the metric relates to the subflow towards a specific end-user. As such, the metric is reported for and should be valid for the end-user device or IoT device for which reliable realtime communication is being requested. In some example implementations and situations, the network may simplify its procedures to generate reliability metrics that are applicable for a certain geographical zone or a certain set of end-users or IoT devices.

One particular technical challenge associated with establishing reliable realtime communications over cellular subflows is the dynamics of the radio channel. For example, the reliability of the radio channel can be impacted due to handover events (and resulting gaps), placement and capabilities of the device at the receiving end, as well as the load and interference caused by multiple users accessing the same system, for example. As such, depending on the situation in which a particular embodiment is implemented or deployed, radio network elements will often play a significant role in contributing to the reliability metric. For example, a base station (or the modem component on the device end) may take into account several radio factors in developing a reliability metric: (1) radio link quality indicators (such as UE's SINR/RSRP/RSRQ/RSSI, or the like, for example); (2) retransmissions (such as L1/L2 ACK/NACK of HARQ process and MAC/RLC ACK/NACK, for example); (3) the relevant cell load, for example, and (4) other radio reliability factors.

In some cases, the reliabilities of other components compared against a specific realtime reliability requirement (which may involve transmission and routing delays, core and gateway processing delays, for example) may be negligible, such that the reliability metric can be estimated based primarily (or, in some instances, entirely) on reliability estimates provided within and/or associated with the radio network layer.

FIG. 6 depicts a graph 600 plotting the cumulative distribution function (CDF) 602 of a radio link. As shown in FIG. 6, the x-axis 604 represents time, with an example indication of 20 ms marked at position 604a. The y-axis 606 in FIG. 6 represents the reliability probability of the radio link, with an example indication of an 85% reliability probability marked at position 606a. In the example shown in FIG. 6, an estimating node has been collecting statistics of the correctly received packets during a preceding time interval (such as during the last second, for example). Based on this information it can, for example, be determined that there an 85% reliability probability of correct packet reception within 20 ms (which may be a configured target for a reliability metric, for example). In some implementations, the metric associated with the radio link may be updated as additional time passes and/or additional information becomes available.

Reporting, Exchange, and Signaling of the Reliability Metric

Example embodiments of the invention described and/or otherwise disclosed herein involve the use of a reliability metric to provide at least a partial basis for a determination of a transmission mode to be used in a hybrid network environment. For the traffic distribution functionality to leverage the reliability metric, the reliability metric must be communicated from the relevant subflow layer to the traffic control entity and/or another network element that is able to control and/or direct the transmission mode used within the hybrid network environment. It will be appreciated that many approaches may be taken to communicating the relevant reliability metrics to the traffic control entity and/or other relevant network elements, and the optimal approach will vary and/or depend on the particulars of the situation and/or network architecture implicated in a given implementation. One consideration that impact the approach taken to communicating the reliability probability metric involves whether the traffic distribution control is entirely centralized (for example, configuring both uplink or downlink transmission) or if part of the traffic distribution control is distributed to the end-user device or IoT device (for example, for autonomously selecting the optimal approach for uplink distribution). For the purposes of simplicity and clarity, some of the examples described herein assume that the traffic distribution system may be viewed as a single system (from the sub-flow perspective) and that the hybrid network environment permits the sub-flow(s) to exchange the reliability metric to the traffic distribution unit (which may then distribute the metric value to its sub-units).

In some example implementations, the reliability metric can be reported on request, periodically, or based on the occurrence of an event. For example, an event can, for instance, be the exceeding of a certain value in the reliability metric or a significant change to last reported value. In some such example implementations and in other example implementations, the traffic distribution unit may incorporate an interface to configure how the reliability metric is defined within the subflow. When setting up the connection, part of the setup process may involve defining which end device the reliability metric is intended to apply to.

Leveraging the Reliability Metric

After receiving the relevant reliability probability metrics associated with the available individual (or single) subflows, the traffic distribution entity will calculate the combined reliability probability metric for the different traffic distribution options. In the example provided below, the combined reliability probability metric is denoted as RPconfn, and can be calculated for the entire set of individual reliability metrics or for a subset of possible traffic distribution configurations to predict reliability:

RPconfn (u, t)=f(RP1 (u,t), RP2(u,t)) (for a non-limiting example of two subflows)

It will be appreciated that "f" is a function of the different reliability probability metrics for a given user, bearer, and/or packet "u" at the time "t". The term "RPx" is used to indicate the reliability metric provided by subflow "x" that relates to the relevant u and t values.

FIGS. 7A-7F present annotated versions of FIGS. 5A-5F wherein the subflows associated with access network 502 have been determined to have a reliability probability RP1=90% and the subflows associated with access network 504 have been determined to have a reliability probability RP2=80%. In the examples presented in FIGS. 7A-7F, it is assumed that the subflows are uncorrelated and (for the purposes of simplicity and clarity) that serially bicasted packets are also uncorrelated. It will be appreciated that in some other example implementations, however, serially bicasted packets will be likely correlated and thus a correlation factor may need to be included in the calculation of a combined reliability probability RPconfn.

Figure 7A:
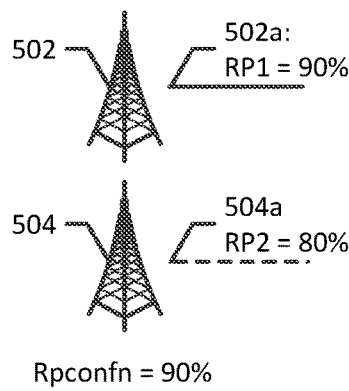

As shown in FIG. 7A, the transmission mode involves a single transmission 502a made via access network 502, and no transmission is made via access network 504. Consequently, RPconfn is the reliability probability of the only subflow used, which in this case is 90%.

Figure 7B:
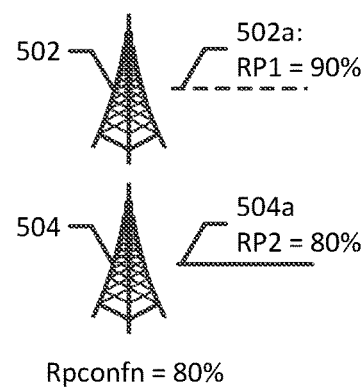

As shown in FIG. 7B, the transmission mode involves a single transmission 504a made via access network 504, and no transmission is made via access network 502. Consequently, RPconfn is the reliability probability of the only subflow used, which in this case is 80%.

Figure 7C:
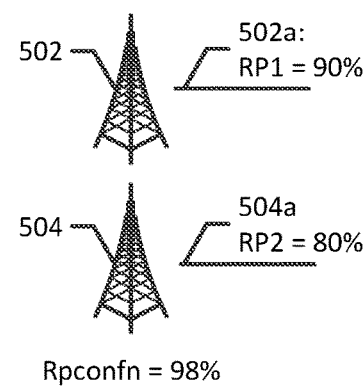

As shown in FIG. 7C, the transmission mode involves bicasting in parallel where a single transmission 502a is made via access network 502, and a single transmission 504a is made via access network 504. RPconfn may be calculated as:

RPconfn=1−(1−0.8)*(1−0.9)=98%

Figure 7D:
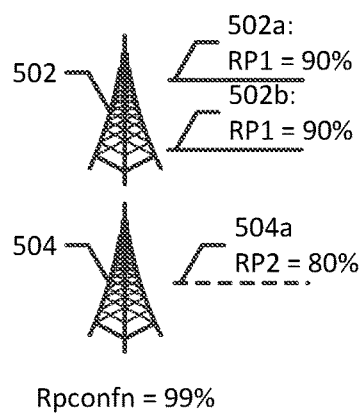

As shown in FIG. 7D, the transmission mode involves serial bicasting, where two transmissions 502a and 502b are made via access network 502, and no transmission is made via access network 504. RPconfn may be calculated as:

RPconfn=1−(1−0.9)*(1−0.9)=99%

Figure 7E:
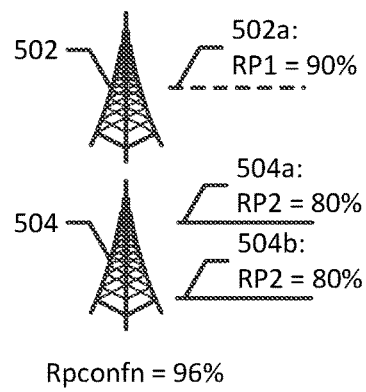

As shown in FIG. 7E, the transmission mode involves serial bicasting, where two transmissions 504a and 504b are made via access network 504, and no transmission is made via access network 502. RPconfn may be calculated as:

RPconfn=1−(1−0.8)*(1−0.8)=96%

Figure 7F:
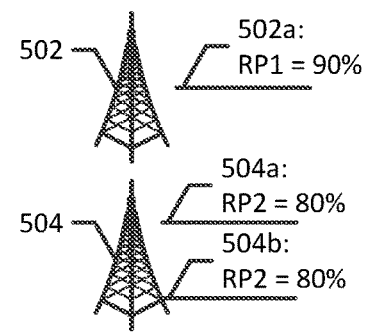

As shown in FIG. 7F, the transmission mode involves serial and parallel bicasting, where one transmission 502a is made via access network 502, and two transmissions 504a and 504b are made via access network 504. RPconfn may be calculated as:

RPconfn=1−(1−0.9)*(1−0.8)*(1−0.08)=99.6%

In FIG. 7, it can be seen that if the reliability associated with a given communication pathway to a device must be 99%, for example (such as if the relevant reliability probability target was set at 99%, for example) only two of the example configurations shown in FIGS. 7A-7F meet the requirement, namely, the serial bicasting on access network 502 shown in FIG. 7D and the serial bicasting on access network 504 plus bicasting on access network 502 shown in FIG. 7F. In some example implementations, the configuration shown in FIG. 7D would be selected based at least in part on its likely having lower cost (since the number of packets to be transmitted and the number of involved networks is lower than that required in the configuration shown in FIG. 7F.

It should be appreciated that in the calculation of the reliability metric for bicasting options, some assumptions may be need to be made regarding any correlation between different transmissions of a given packet. For example, for a single subflow, the duplication of a packet within a very short interval may lead to either loss of both packets or success of both packets in all or nearly all instances. In such an example of correlated transmission, bicasting may have limited value overall. However, as each subflow is generally assumed to be unaware of how the traffic distribution unit operates, some of the examples described herein will assume that such correlation estimates are calculated and estimated within the traffic distribution unit and updated over time monitoring bicasting performance.

In general, the selection of the preferred traffic distribution mode, among the modes which meet a pre-defined reliability probability target (such as a reliability target associated with a sequence of L3/L4 packets, for example) will be selected with the objective of minimizing a defined cost function (which may include, for example, the costs of network/bandwidth use, energy, network resources, and/or the like, for example).

FIG. 8 depicts a message flow 800 that provides an example illustration of a signaling flow that may occur in accordance with example embodiments of the invention. As shown in FIG. 8, message flow 800 involves the exchange of messages between a user equipment device 802, a first access network 804, a second access network 806 and an MPTCP traffic distribution entity 808. In some example implementations of message flow 800, the network entities 802, 804, 806, and 808 may be arranged in a manner similar to those of the corresponding entities in FIGS. 3 and 4. The example presented in FIG. 8 illustrates a switch from a "single-interface-only" mode to a "duplicate failed packets on the other interface" mode and a "bi-casting in parallel" mode triggered by the indication that some TCP segments may be failing to meet the relevant latency and/or reliability requirements due to lower layer failures. In such an example, the packets duplicated on the other interface may be sent with a tag "high priority/low latency" and/or a similar indication.

As shown in FIG. 8, message flow 800 commences with messages 811 and 812, which may take the form of queries from the MPTCP traffic distribution entity 808 to access network 804 and access network 806, respectively. Upon receipt of a query seeking a reliability probability, the access networks 804 and 806 estimate and/or otherwise determine their individual reliability probabilities (RP) metrics associated with the user equipment device 802. In some example implementations, this may involve determining reliability probability metrics based on measurements associated with the user equipment device 802 and/or other active user equipment devices. In connection with the transmission of the queries to access networks 804 and 806, the MPTCP traffic distribution entity 808 may attempt to assess the initial and/or current traffic distribution mode used in connection with the user equipment device 802. This assessment may be based, for example, on historical data, a reliability probability metric received in connection with user equipment device 802, and/or a default setting.

As shown in FIG. 8, message flow 800 continues with message 813, where the user equipment device 802 establishes a connection with the MCTCP traffic distribution entity 808. In the example depicted in FIG. 8, the MPTCP traffic distribution entity 808 applies a "single interface only" traffic distribution mode as the initial mode to be used with the user equipment device 802. As shown at message 814, TCP segments 1-N may be sent over one subflow to the access network 804. As shown at message 815, those same TCP segments 1-N are scheduled and transmitted to the user equipment device 802. Upon receipt of the TCP segments, the user equipment device 802 may combine the received TCP subflow(s) into a single TCP connection according to MPTCP mechanisms.

As shown at message 816, the user equipment device 802 may send L1/L2 ACK messages back to the access network 804, and, as shown at message 817, may send one or more TCP segment(s) ACK indications back to the MPTCP traffic distribution entity.

As time progresses, the first access network 804 may periodically provide an updated reliability probability RP1 to the MPTCP traffic distribution entity 808, as shown at message 818. Likewise, the second access network 806 may provide an updated reliability probability RP2 to the MPTCP traffic distribution entity 808, as shown at message 819. In the example depicted in FIG. 8, upon receipt of the updated reliability probabilities, the MPTCP traffic distribution entity 808 may assess the reliability provided by the current traffic distribution mode and determine that the current mode satisfies the applicable reliability metrics associated with a given situation. Consequently, and as shown at message 820, the MPTCP traffic distribution entity 808 may continue to use the single interface only distribution mode to send TCP segments N+1–M over the subflow associated with access network 804, which, as shown in message 821, are then scheduled and set by access network 804 to the user equipment device 802. As discussed in connection with message 815, the user equipment device 802 may combine the received TCP subflow(s) into a single TCP connection according to MPTCP mechanisms.

In some example implementations, such as the example shown in FIG. 8, the user equipment device 802 may not properly receive all or some of the packets associated with a given transmission. As shown in message 822, the user equipment device 802 may transmit an L1/L2 NACK message to the access network 804, which in turn transmits message 823 (which may include an updated reliability probability RP1 that reflect the NACK event) to the MPTCP traffic distribution entity 808. Upon receipt of message 823, the MPTCP traffic distribution entity 808 assesses the combined reliability probability of the current traffic distribution mode. Upon determining that the current mode likely does not satisfy the relevant requirements (for example, that the reliability of the current mode may fall below a target value), the MPTCP traffic distribution entity evaluates alternative modes. In the example depicted in FIG. 8, the MPTCP traffic distribution entity selects and/or assigns a bicast in parallel mode to be used in connection with user equipment device 802, such that a replica of the failing TCP segments are transmitted to the user device 802 over the second access network 806.

As shown in FIG. 8, message flow 800 continues at message 824, where TCP segments N+1–M are sent over a subflow associated with access network 806. In some implementations of message 824, the TCP segments may be flagged a "high priority/low latency" in order to receive prioritized transmission, scheduling, and/or other treatment by the relevant network elements. Access network 806 then schedules the TCP segments N+1–M for delivery to the user equipment device 802, as shown in message 825. In some situations, it is possible that a TCP NACK indication for the TCP segments failing over access network 804 will not be triggered, as the duplicated segments are received earlier. As shown at message 826, upon receipt of the TCP segments N+1−M from access network 806, the user equipment device 802 may transmit an L1/L2 ACK indication to access network 806. Upon receipt of such an indication, the access network 806 may map any flagged segments to a highest priority QoS flow and treat such flagged segments with priority. As shown at message 827, the message flow 800 may conclude upon the transmission of a TCP segment(s) ACK indication to the MPTCP traffic distribution entity 808.

In some example implementations of embodiments of the invention that can be performed in an environment similar to those provided in FIGS. 3, 4, and 8, the traffic distribution entity and relevant access network monitors each subflow where data was earlier sent to estimate the reliability metric associated with a given user equipment device. In some such example implementations, and in other example implementations, the traffic distribution entity and access network probes each subflow where data was not sent earlier to estimate the relevant reliability metric. In cases where the reliability metric per subflow is not available and/or is not signaled by the relevant access network, the reliability metric can be estimated at the traffic distribution entity based, for example, on the subflow's quality, RTT, bandwidth, and/or other performance metrics.

In some example implementations, the traffic distribution entity selects and may dynamically adjust the traffic distribution mode used in connection with a given user equipment device in the next relevant period. Depending on the particulars of the network environment in which a given implementation is provide, the period length may vary from a few milliseconds, to hundreds of milliseconds, or up to times measured on the order of full seconds. As noted above with respect to FIGS. 5 and 7, a wide variety of different transmission modes. In some example implementations, the traffic distribution modes may comprise at least the following, which are listed from most resource efficient to least efficient:

(1) "Single-interface-only": In this mode, only the primary network is used during the next period for transmission of all packets of a certain relevant application, IP flow, and/or QoS flow.

(2) "Duplicate failed packets on the same/other interface": In this mode, fast duplication over the other or same interface of packets based on the fast detection that some TCP segments may be failing to meet the relevant latency and/or reliability requirements (which may be due, for example, to lower layer failures).

(3) "Bi-casting serially": In this mode, n replicas of each packet are transmitted over one network, where n>=2.

(4) "Bi-casting in parallel": In this mode, n replicas of each packet are transmitted over different networks, where n>=2.

It will be appreciated that in some example implementations, the traffic distribution mode switch is triggered by the prediction that the reliability target may not be met with a certain probability or likewise it may not be met by a certain offset (for example with an additional X ms of additional latency introduced).

In example implementations, each access network determines the actual or predicted reliability metric that expresses the reliability which is being provided and/or can be provided in the next period (if available). The reliability metric could be expressed in terms of latency and/or RTT to deliver the current buffered traffic. In some such implementations, the reliability metric may also consider the relevant user equipment device's SINR, RSRP, RSRQ, RSSI, cell load, status of L1/L2 ACK/NACK (which may involve HARQ processes in use and L1 ACK/NACK status, MAC/RLC ACK/NACK status or the like, for example), and/or other factors. Granularity of the metric could be at a user, application, packet, sequence of packets, and/or priority/flagged packets level. In the case of priority and/or flagged packets, the flagging could be, for example, placed in one or more fields in the protocol header (for example, ECN, IP header), or piggybacked with a relevant payload.

Referring now to FIG. 9, the operations performed by the apparatus 200 of FIG. 2 in accordance with an example embodiment of the present invention are depicted as an example process flow 900. In this regard, the apparatus includes means, such as the processor 202, the memory 204, the user interface 206, the communication interface 208 or the like, for receiving, at a traffic distribution entity in a hybrid network environment, a first reliability probability indicator associated with a first access network and a second reliability probability indicator associated with a second access network; determining, based at least in part on the first reliability probability indicator and the second reliability probability indicator, a combined reliability probability for each traffic distribution mode within a plurality of traffic distribution modes; ranking each traffic distribution mode with a combined reliability probability above a target reliability probability; and selecting a traffic distribution mode with a combined reliability probability above the target reliability probability.

The apparatus includes means, such as the processor 202, the memory 204, the user interface 206, the communication interface 208 or the like, for receiving, at a traffic distribution entity in a hybrid network environment, a first reliability probability indicator associated with a first access network and a second reliability probability indicator associated with a second access network. With reference to FIG. 9, process flow 900 may commence at block 902, which includes receiving a first probability indicator associated with a first access network and a second reliability probability indicator associated with a second access network. As discussed throughout this disclosure, many example implementation of embodiments of the invention are directed to providing for the efficient distribution of traffic in a hybrid network in a manner that meets the potentially mission critical reliability criteria associated with a user equipment device, such as a cyberphysical system (which may include, for example, an autonomous vehicle, drone, or piece of industrial equipment). In some example implementations, of process 900 in general and block 902 in particular, the first reliability probability indicator is an indicator of a composite metric of a packet loss ratio and a latency associated with the first access network and wherein the second reliability probability indicator is an indicator of a composite metric of a packet loss ratio and a latency associated with the second access network. Moreover, in some example implementations, the first reliability indicator and the second reliability indicator are associated a cyberphysical system operating within the hybrid network. Any approach to determining and/or conveying a reliability probability described and/or otherwise contemplated herein may be used in connection with example implementations of block 902. Moreover, in some example implementations of block 902 the hybrid network environment is a multi-path transmission control protocol (MPTCP) environment. However, it will be appreciated that example implementations of process 900 and/or other embodiments of the invention may be realized in other hybrid network environments.

It will also be appreciated that the reliability metrics used in connection with example implementations of embodiments of the invention may be determined on a per service, application, device, user equipment, bearer, and/or flow basis. In some example implementations, it may be particularly advantageous to define and/or use reliability probabilities or other related metrics that are associated with a particular piece of user equipment and/or other device within a network environment.

The apparatus also includes means, such as the processor 202, the memory 204, the user interface 206, the communication interface 208 or the like, for determining, based at least in part on the first reliability probability indicator and the second reliability probability indicator, a combined reliability probability for each traffic distribution mode within a plurality of traffic distribution modes. With reference to FIG. 9, process flow 900 may continue to block 904, which includes computing a combined reliability probability for each traffic distribution mode within a plurality of traffic distribution modes. As noted herein, particularly with reference to FIGS. 5 and 7 and the discussion related thereto, some example implementations of embodiments of the invention are aimed towards identifying traffic distribution modes, such as single transmission modes, parallel bicasting modes, serial bicasting modes, and/or combinations thereof which are capable of meeting reliability requirements that may be necessary to ensure the proper operation of cyberphysical systems and/or other network entities.

Moreover, in some example implementations, the first reliability indicator and the second reliability indicator are associated with at least part of a cyberphysical system or a high-reliability low-latency communication system operating within the hybrid network. In such implementations, the combined reliability probability for each traffic distribution mode within the plurality of traffic distribution modes will also typically be associated with at least part of the cyberphysical system or the high-reliability low-latency communication system operating within the hybrid network, such that the component reliability probabilities and the combined reliability probability is device-specific or based at least in part on the characteristics of a particular device. In some such example implementations, the target reliability probability comprises a real-time reliability requirement associated with the cyberphysical system or the high-reliability low-latency communication system operating within the hybrid network. As noted herein, some example implementations (such as those involving autonomous vehicles or drones, for example) involve potentially mission-critical operations that require communications to be reliably achieved within critical timeframes. Any of the approaches to determining a combined reliability probability for a given traffic distribution mode described and/or otherwise contemplated herein may be used in connection with example implementations of process flow 900.

The apparatus also includes means, such as the processor 202, the memory 204, the user interface 206, the communication interface 208 or the like, for ranking each traffic distribution mode with a combined reliability probability above a target reliability probability. With reference to FIG. 9, process flow 900 may proceed to block 906, which includes ranking each traffic distribution mode with a combined reliability probability above a target reliability probability. As discussed herein, a cyberphysical system, a user equipment device, and/or applications or other processes associated therewith may require communications to be at or above a predetermined target reliability probability threshold to ensure the safe and/or otherwise proper operation of the network given network entity and/or process. Moreover, since network resources may be limited, it may be necessary in some situations to rank any acceptable traffic distribution mode to identify the mode that best meets the requirements of the user equipment device and the hybrid network in which the device seeks to operate. In some such example implementations, ranking each traffic distribution mode with a combined reliability probability above a target reliability probability comprises applying a predefined cost function to each traffic distribution mode. For example the cost function may allow for the evaluation, weighting, and/or other ranking of traffic distribution modes based on the network resources and/or other costs associated with implementing the particular traffic distribution mode. In some example implementations, other metrics may be involved in the ranking of one or more traffic distribution modes. For example, metrics and/or other information related to energy efficiency, the bandwidth required to accomplish a transmission, and/or other factors may be used as ranking criteria and/or incorporated into a cost function and/or other ranking rule set.

The apparatus also includes means, such as the processor 202, the memory 204, the user interface 206, the communication interface 208 or the like, for selecting a traffic distribution mode with a combined reliability probability above the target reliability probability. With reference to FIG. 9, process flow 900 may proceed to block 908, which includes selecting a traffic distribution mode with a combined reliability probability above the target reliability probability. Any of the approaches described and/or otherwise contemplated herein may be used in connection with selecting a given traffic distribution mode. In some example implementations, the selected mode will be the highest ranked mode. In some example implementations, a traffic distribution entity may select and/or switch a traffic distribution mode based on receipt of information associated with one or more reliability probabilities.

With reference to FIGS. 5, 7 and 8, and the discussions related thereto, it will be appreciated that in some example implementations selecting a traffic distribution mode comprises causing a transmission to be directed to the cyberphysical system via one subflow associated with the first access network. In some such example implementations, and in other example implementations, selecting a traffic distribution mode comprises causing a bicasted transmission to be directed to the cyberphysical system via one subflow associated with the first access network and via one subflow associated with the second access network. Likewise, in some example implementations of block 908, selecting a traffic distribution mode comprises causing a transmission to be directed to the cyberphysical system via one subflow associated with the first access network and causing a bicasted version of the transmission to be directed to the cyberphysical system via the second access network. It will be appreciated that other traffic distribution modes may be selected, based on the particulars of the network environment in which a given embodiment is implemented.

It will be appreciated that some implementations of embodiments of the invention described and/or otherwise disclosed herein allow for users of the invention and/or other entities associated with the operation of network devices to ensure that the required level of reliability is provided for cyber physical systems within hybrid networks. In particular, some example environments allow for the use and leveraging of network resources (including but not limited to disparate and/or legacy network resources) to achieve the necessary reliability levels required for certain application while using the network and/or user equipment resources in an efficient manner. Moreover, in implementations that allow for the rapid switching of traffic distribution modes and/or the fast detection of potential changes in reliability probabilities, the ability to react upon situations where violation of the requirements can be anticipated with certain likelihood may be advantageous. For example, in implementations involving autonomous driving or drone control, example implementations of embodiments of the invention can be applied and be advantageous in ensuring the necessary communication reliability needed to safely and accurately operate such systems.

It will be appreciated that, in some situations, none of the combined reliability probabilities of the traffic distribution modes will satisfy the relevant target reliability probability. For example, in a given situation, the target reliability probability may be set at a level that is high enough that the available access networks or other network pathways within a hybrid network environment may not be able to be combined in a manner that meets the threshold. In other situations, hybrid network may be damaged, incompletely implemented, and/or otherwise subject conditions that limit the reliability of the various relevant network components. In some such example implementations, the combined reliability probabilities of the available traffic distribution modes may be ranked, and the highest ranked traffic distribution mode may be selected. In some such example implementations, the apparatus and/or other relevant network element may check and update the individual reliability probabilities and/or combined reliability probabilities at a more frequent rate, with the goal of identifying changes in the reliability probabilities that may allow for the selection of a traffic distribution mode that meets the target requirements. In some example implementations, selecting a traffic distribution mode that does not satisfy the requirements of the target distribution mode may also involve the initiation and/or coordination of actions designed to limit risks associated with the relevant user device. For example, in the case of cyberphysical systems such as an autonomous car, train, or drone, the selection of a traffic distribution mode with a reliability probability that does not satisfy the relevant target requirements may trigger the transmission of commands that would stop the car, slow down the train and/or land the drone, as appropriate.

As described above, FIG. 9 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (such as hardware, for example) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method performed by a traffic distribution entity of a hybrid network, the method comprising:

receiving, from a first access network of the hybrid network, a first reliability probability indicator for a first subflow for traffic and receiving, from a second access network of the hybrid network, a second reliability probability indicator for a second subflow for traffic, wherein the first subflow is from the traffic distribution entity to a traffic recombination entity of the hybrid network via the first access network and the second subflow is from the traffic distribution entity to the traffic redistribution entity via the second access network;

determining based at least in part on the first reliability probability indicator for the first subflow and the second reliability probability indicator for the second subflow, a combined reliability probability for each traffic distribution mode within a plurality of traffic distribution modes;

selecting a traffic distribution mode of the plurality of traffic distribution modes with a combined reliability probability above a target reliability probability based at least on a ranking of each traffic distribution mode with the combined reliability probability above the target reliability probability; and causing at least one transmission of traffic to the traffic recombination entity via at least one of the first subflow and the second subflow based on the selected traffic distribution mode.

2. The method of claim 1, wherein the first reliability probability indicator for the first subflow is an indicator of a composite metric of a packet loss ratio and a latency for the first subflow and wherein the second reliability probability indicator for the second subflow is an indicator of a composite metric of a packet loss ratio and a latency for the second subflow.

3. The method of claim 1, wherein the traffic distribution entity is a multi-path transmission control protocol (MPTCP) device.

4. The method of claim 1, wherein the traffic distribution entity is at least part of a cyberphysical system or a high-reliability low-latency communication system operating within the hybrid network;
wherein the target reliability probability comprises a real-time reliability requirement associated with the cyberphysical system or the high-reliability low-latency communication system operating within the hybrid network.

5. The method of claim 1, wherein each traffic distribution mode with the combined reliability probability above the target reliability probability is ranked by applying a predefined cost function to each traffic distribution mode.

6. The method of claim 1, wherein the selected distribution mode is a single interface only traffic distribution mode and wherein causing at least one transmission of traffic to the traffic recombination entity via at least one of the first subflow and the second subflow based on the selected traffic distribution mode comprises causing a single transmission of traffic to the traffic recombination entity via the first subflow or the second subflow.

7. The method of claim 1, wherein the selected traffic distribution mode is a bi-casting in parallel traffic distribution mode and wherein causing at least one transmission of traffic to the traffic recombination entity via at least one of the first subflow and the second subflow based on the selected traffic distribution mode comprises causing a first transmission of traffic to the traffic recombination entity via the first subflow and causing a second transmission of traffic via the second subflow, and wherein the second transmission of traffic is a bicasted version of the first transmission of traffic.

8. The method of claim 1, wherein the selected traffic distribution mode is a bi-casting serially traffic distribution mode and wherein causing at least one transmission of traffic to the traffic recombination entity via at least one of the first subflow and the second subflow based on the selected traffic distribution mode comprises causing a first transmission of traffic to the traffic recombination entity via the first subflow associated with the first access network and causing a second transmission of traffic to the traffic recombination entity via the first subflow, and wherein the second transmission is a bicasted version of the first transmission.

9. The method of claim 1, wherein selecting a traffic distribution mode of the plurality of traffic distribution modes with a combined reliability probability above the target reliability probability based at least on a ranking of each traffic distribution mode with the combined reliability probability above the target reliability probability comprises selecting the traffic distribution mode with the highest ranking.

10. An apparatus comprising at least one processor and at least one memory storing computer program code, the at least one memory and the computer program code configured to, with the processor, cause the apparatus to at least:
receive, from a first access network, a first reliability probability indicator for a first subflow for traffic with a first access network and receive, from a second access network, a second reliability probability indicator for a second subflow for traffic, wherein the first subflow is from a traffic distribution entity to a traffic recombination entity of the hybrid network via the first access network and the second subflow is from the traffic distribution entity to the traffic redistribution entity via a second access network;
determine, based at least in part on the first reliability probability indicator for the first subflow and the second reliability probability indicator for the second subflow, a combined reliability probability for each traffic distribution mode within a plurality of traffic distribution modes;
select a traffic distribution mode of the plurality of traffic distribution modes with a combined reliability probability above a target reliability probability based at least on a ranking of each traffic distribution mode with the combined reliability probability above the target reliability probability; and
cause at least one transmission of traffic to the traffic recombination entity via at least one of the first subflow and the second subflow based on the selected traffic distribution mode.

11. The apparatus of claim 10, wherein the first reliability probability indicator for the first subflow is an indicator of a composite metric of a packet loss ratio and a latency for the first subflow and wherein the second reliability probability indicator for the second subflow is an indicator of a composite metric of a packet loss ratio and a latency for the second subflow.

12. The apparatus of claim 10, wherein the traffic distribution entity is a multi-path transmission control protocol (MPTCP) device.

13. The apparatus of claim 10, wherein the traffic distribution entity is at least part of a cyberphysical system or a high-reliability low-latency communication system operating within the hybrid network;
wherein the target reliability probability comprises a real-time reliability requirement associated with the cyberphysical system or the high-reliability low-latency communication system operating within the hybrid network.

14. The apparatus of claim 10, wherein each traffic distribution mode with a combined reliability probability above the target reliability probability is ranked by applying a predefined cost function to each traffic distribution mode.

15. The apparatus of claim 10, wherein the selected traffic distribution mode is a single interface only traffic distribution mode and wherein the at least one memory and the computer program code are configured to, with the processor, cause the apparatus to cause at least one transmission of traffic to the traffic recombination entity via at least one of the first subflow and the second subflow based on the selected traffic distribution mode by causing a single transmission of traffic from the traffic distribution entity to the traffic recombination entity via the first subflow or the second subflow.

16. The apparatus of claim 13, wherein the selected traffic distribution mode is a bi-casting in parallel traffic distribution mode and wherein the at least one memory and the computer program code are configured to, with the processor, cause the apparatus to cause at least one transmission of traffic to the traffic recombination entity via at least one of the first subflow and the second subflow based on the selected traffic distribution mode by causing a transmission to a cyberphysical system via the first subflow associated with the first access network and via the second subflow associated with the second access network.

17. The apparatus of claim 13, wherein the selected traffic distribution mode is a bi-casting serially traffic distribution mode and wherein causing a first transmission of traffic from the traffic distribution entity to the traffic recombination entity via the first subflow and causing a second transmission of traffic from the traffic distribution entity to the traffic recombination entity via the first subflow, wherein the second transmission is bicasted version of the first transmission.

18. The apparatus of claim 10, wherein selecting a traffic distribution mode of the plurality of traffic distribution modes with a combined reliability probability above the target reliability probability based at least on a ranking of each traffic distribution mode with the combined reliability probability above the target reliability probability comprises selecting the traffic distribution mode with the highest ranking.

19. A computer program product comprising at least one non-transitory computer-readable storage medium having computer-executable program code instruction stored therein, the computer-executable program code instructions comprising program code instructions configured to:
receive, from a first access network, a first reliability probability indicator for a first subflow for traffic and receive, from a second access network, a second reliability probability indicator for a second subflow for traffic, wherein the first subflow is from a traffic distribution entity to a traffic recombination entity of the hybrid network via the first access network and the second subflow is from the traffic distribution entity to the traffic redistribution entity via the second access network;
determine, based at least in part on the first reliability probability indicator for the first subflow and the second reliability probability indicator for the second subflow, a combined reliability probability for each traffic distribution mode within a plurality of traffic distribution modes;
select a traffic distribution mode for the plurality of traffic distribution modes with a combined reliability probability above a target reliability probability; and
cause at least one transmission of traffic to the traffic recombination entity via at least one of the first subflow and the second subflow based on the selected traffic distribution mode.

20. The computer program product of claim 19, wherein the first reliability probability indicator for the first subflow is an indicator of a composite metric of a packet loss ratio and a latency for the first subflow and wherein the second reliability probability indicator for the second subflow is an indicator of a composite metric of a packet loss ratio and a latency for the second subflow.

* * * * *